(12) United States Patent
Gelbmann

(10) Patent No.: US 6,186,176 B1
(45) Date of Patent: Feb. 13, 2001

(54) SYSTEM AND METHOD FOR CONTROLLING THE FLOW OF A GASEOUS MEDIUM THROUGH A FLUID

(75) Inventor: Gottfried Gelbmann, Purbach (AT)

(73) Assignee: Knorr-Bremse Systeme fuer Schienenfahrzeuge GmbH, Munich (DE)

( * ) Notice: Under 35 U.S.C. 154(b), the term of this patent shall be extended for 0 days.

(21) Appl. No.: 09/288,614

(22) Filed: Apr. 9, 1999

(30) Foreign Application Priority Data

Apr. 9, 1998 (DE) .............................................. 198 16 208

(51) Int. Cl.$^7$ .................................................. F16K 31/02
(52) U.S. Cl. ..................... 137/807; 137/827; 137/251.1; 137/596; 137/909
(58) Field of Search ................................... 137/807, 827, 137/251.1, 909, 596

(56) References Cited

U.S. PATENT DOCUMENTS

| 2,417,550 | | 3/1947 | Guyer . | |
|---|---|---|---|---|
| 2,575,360 | | 11/1951 | Rabinow . | |
| 2,670,749 | * | 3/1954 | Germer | 137/900 X |
| 2,820,471 | * | 1/1958 | Crowell | 137/251.1 |
| 4,532,853 | * | 8/1985 | Stangroom | 137/807 X |
| 4,742,998 | * | 5/1988 | Schubert | 137/807 X |
| 5,158,109 | * | 10/1992 | Hare, Sr. | 137/909 X |
| 5,190,073 | * | 3/1993 | Vogt | 137/827 X |
| 5,241,991 | * | 9/1993 | Iorio et al. | 137/909 X |
| 6,044,866 | * | 4/2000 | Rohrbeck | 137/807 |

* cited by examiner

Primary Examiner—John Rivell
(74) Attorney, Agent, or Firm—Evenson, McKeown, Edwards & Lenahan, P.L.L.C.

(57) ABSTRACT

A method and system for controlling the flow of a gaseous medium through a fluid are described. The method includes providing a rheologic fluid through which a gaseous medium can be conducted, and controlling the viscosity of the rheologic fluid to control the flow of the gaseous medium. The system has a rheologic fluid, which is located in particular in a device to be controlled, a guide guiding the gaseous medium through the fluid, and a field applier for applying a field at least partially in the area of the rheologic fluid.

25 Claims, 2 Drawing Sheets

SYSTEM AND METHOD FOR CONTROLLING THE FLOW OF A GASEOUS MEDIUM THROUGH A FLUID

This application claims the priority of German application 198 16 208.1, filed in Germany Apr. 9, 1998, the disclosure of which is expressly incorporated by reference herein.

BACKGROUND AND SUMMARY OF THE INVENTION

The present invention relates to a method and device for controlling the flow of a gaseous medium through a fluid and/or a device. The present invention also relates to the use of a rheologic fluid for various pneumatic applications.

General information concerning rheologic fluids can be found in "An Introduction to Rheology" by H. A. Barnes, J. F. Hutton, and K. Walters, 1989. Also, see U.S. Pat. Nos. 2,417,550 and 2,575,360 for a description of magnetic rheologic effects fluids.

Rheologic fluids, particularly magnetorheologic and electrorheologic fluids, the latter alternatively being known as electroviscous fluids, have interesting properties. These interesting properties include in particular the fact that when a magnetic field is applied to a magnetorheologic fluid and an electrical field is applied to an electrorheologic fluid, a fluid-solid phase transition takes place. Typically a magnetic field on the order of magnitude of approximately 1 kG or an electrical field on the order of magnitude of 1 kV/mm for such a fluid or such a suspension to become solidified is required. This means that the suspension or fluid has a finite flow (plasticity) limit in the field so that each process that occurs is reversible and the degree of fluidity of the suspension or fluid can be intentionally adjusted by changing the strength of the external electrical or magnetic field. The term "fluid" below will be understood to cover liquids and suspensions.

One advantage of an electrorheologic fluid is that the fluids are essentially insulators, so that the power draw is relatively small. Adaptive bumpers and clutches for motor vehicles, for example, can be made with rheologic fluids. Such applications are made possible by the fact that the solidification process takes place on a time scale of approximately $10^{-3}$ to $10^{-2}$ seconds.

Possible electroviscous fluids for example are a mixture of approximately 40 to 60 wt. % silicic acid as the solid, 30 to 50 wt. % of a suitable organic phase with a low electric constant, 5 to 10 wt. % water, and 5 wt. % of a dispersing agent, which have a basic viscosity of 100 to 3000 nPa.s and a mixture with 50 to 60 wt. % of a silicitic acid, 30 to 50 wt. % of an organic phase with a low boiling point, 10 to 50 wt. % water, and 5 wt. % of a dispersing agent such as isododecane.

European Patent 0 222 350 teaches an air spring element in which the spring body is disposed inside a chamber enclosed by a rubber-elastic peripheral wall and two rigid end walls, with the external chamber between the spring body and the peripheral wall, said chamber being divided by the spring body, being filled with an electroviscous liquid controllable by an electrical field.

Unpublished European disclosure 0 590 808 teaches a clutch for a motor vehicle, in which two parts are rotatably connected with each other. These parts move during rotation partially by an electroviscous liquid and a correspondingly greater or lesser coupling of the two parts is controlled by the application of a voltage.

The common feature of these two known applications is that the electrorheologic fluids are used as power transfer media. This has the drawback that the mechanical components, which are frequently made of metal for example, are exposed to the aggressive, particularly chemical, influences of the rheologic fluids. Also, no application can be derived from these two known applications that uses the rheologic fluid, particularly the electroviscous liquid, as a non-power-transferring medium.

Accordingly, the present invention relates to the use of a rheologic fluid as a non-power-transferring medium with in particular any mechanical components not being exposed to the aggressive, in particular chemical, influences of the fluid. Another goal of the present invention is to provide a method and a device for controlling the flow of a gaseous medium through a fluid and uses of a rheologic fluid wherein, in particular, the rheologic fluid is not used as a power-transferring medium and in particular the relatively small yield stress of the rheologic fluid has a non-disadvantageous effect.

These goals are achieved according to preferred embodiments of the invention by providing a system and a method for controlling the flow of a gaseous medium through a fluid which has the following method steps:

provision of a rheologic fluid through which the gaseous medium can be conducted, and controlling the viscosity of the rheologic fluid.

These features use advantageous properties of rheologic fluids, particularly the property of a rheologic fluid that its degree of viscosity or fluidity can be intentionally changed. This intentional change is based on the microscopic mechanism of the field-induced solidification of the fluid, for which there are various theoretical models in which for example induced dipolar forces or the properties of water bridges play an important role. Here, the previously isotropic material becomes strongly anisotropic when a field or for example external (dynamic) shear forces is/are applied. When an electrical field for example is applied, chains are formed under certain circumstances that are preferably oriented in the direction of the external field.

Preferably, the rheologic fluid is an electrorheologic fluid and/or a magnetorheologic fluid. This makes it particularly easy to change the properties of the fluid. Also preferably the viscosity of the fluid is controlled by applying a controllable field. This simplifies controlling the viscosity of the fluid.

Advantageously, the controllable field is an electrical, magnetic, and/or electromagnetic field. This can be either static or dynamic.

Also preferably the gaseous medium is air, which advantageously makes a number of pneumatic applications possible at low cost.

According to the invention, a rheologic fluid is used for controlling the flow of a gaseous medium by the fluid. Preferably, the rheologic fluid in this case is an electrorheologic and/or a magnetorheologic fluid, which simplifies its use for various applications.

According to the invention, a device for controlling the flow of a gaseous medium through a fluid and/or through a device is characterized by a rheologic fluid, which is located in particular in the device, a means of guiding the gaseous medium through the fluid, and a means for applying a field at least partially in the area of the rheologic fluid.

Preferably, the rheologic fluid is an electrorheologic and/or or magnetorheologic fluid. In particular in this case the field can preferably be an electrical, magnetic, and/or electromagnetic field and preferably the means for applying a field can have electrical and/or magnetic and/or electromagnetic components. Such components are for example electrically conducting wires, electrically conducting plates, capacitors, or electromagnets, and, since the power draw of the rheologic fluid is relatively low, for example conducting plastics as well.

Preferably, the gaseous medium is air. This choice leads to for example electropneumatic devices at low cost. If preferably the means of guiding the gaseous medium are strips, which are located in the device and at least partially wetted by the fluid, the path of the gaseous medium is more precisely specified and in particular can be extended, which can in particular lead to a stronger blockade or slower flow of the gaseous medium through the fluid.

If preferably the fluid is at a distance from chemically vulnerable materials, the service life or operating time of such devices is prolonged.

According to certain preferred embodiments of the invention the device just described is used as a component for an overpressure valve. In this case, the pressure point is preferably set by the strength of the field applied. The higher the field applied, the higher the pressure point. In particular, in this application of the device, it must be borne in mind that the direction in which the field is applied makes a difference for certain anisotropic rheologic fluids.

According to the invention at least one of the devices described is used as a component of a control valve. In one application of one of the above-mentioned devices as a component for a control valve, it is possible to connect corresponding consumers such as pumps or cylinders for example.

Advantageously, an overpressure valve is created by one of the above-described devices, in which a pressure point can be set by the strength of the field applied.

Also, a control valve is advantageously characterized by at least two of the above-described devices, providing an outlet and an inlet for the gaseous medium and connecting the outlet of one of the devices with the inlet of the other device. Preferably, a consumer can be linked to the connection between the two devices. This measure makes an advantageous electropneumatic device available.

Advantageously, one of the above-mentioned devices is used for pneumatic control and/or regulation.

In the context of this invention, "control" also means "regulation," meaning that whenever the term "control" is used in the context of this invention, it also covers the meaning of "regulation."

The invention will now be described without limitation of the general inventive idea on the basis of embodiments with reference to the drawings, to which express reference is made as well regarding the disclosure of all of the details according to the invention that are not explained in greater detail in the text.

Other objects, advantages and novel features of the present invention will become apparent from the following detailed description of the invention when considered in conjunction with the accompanying drawings.

DETAILED DESCRIPTION OF THE DRAWINGS

Figure 1:
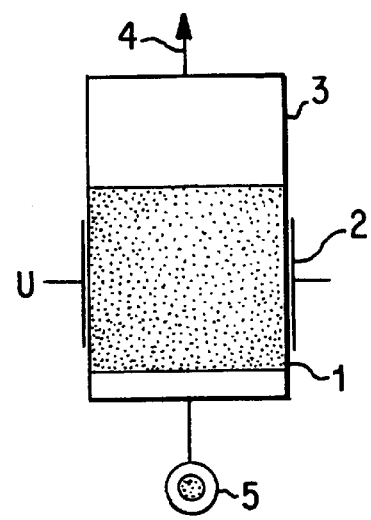
FIG. 1 is a schematic sectional view of a device for controlling the flow of a gaseous medium through a fluid, constructed according to a preferred embodiment of the invention.

In the following figures, identical or corresponding parts are given the same reference numerals, so they do not have to be re-introduced and only the differences between these embodiments and the first embodiment will be explained:

FIG. 1 shows an embodiment according to the invention of a device for controlling the flow of a gaseous medium through a fluid 1 and/or a device 3, shown schematically. In FIG. 1, an electroviscous liquid 1 is located in a container 3. The electroviscous liquid 1 is enclosed at least partially by conducting plates 2 or a plate capacitor 2 or this plate capacitor 2 is disposed outside electroviscous liquid 1 and container 3. A voltage U can be applied to this plate capacitor.

Embodiments in which electrically conducting parts are located inside container 3 and even inside electroviscous liquid 1 are also contemplated. In this case, a strip-like arrangement of plate capacitor 2 or the conducting parts to which a voltage can be applied is contemplated.

Gas can be conducted through an inlet 5 through container 3 and hence electroviscous liquid 1 can be guided to outlet 4, which makes the pressure of the gas at the inlet higher than at the outlet. The gas conducted through, air for example, can be used in this electropneumatic device as a power transfer medium. As a preferred embodiment, the device can be designed such that the gas first passes through a lamellar space filled with the electroviscous liquid, then passes through a region in which the gas separates from the liquid, and escapes from the device, and an electrical voltage is applied to this device which causes an electrical field to be generated in the lamellar space or lamellar container. Because of the above-described behavior of electroviscous liquids in an electrical field, the gas stream that flows through the device is influenced.

This device can be called an "electropneumatic transistor" by analogy with a transistor, as pneumatic variations can be brought about by changing the electrical field.

For example the device according to FIG. 1 can be used directly as an overpressure valve or as a type of gas pressure throttle. The pressure point for a corresponding overpressure valve can be set by appropriately adjusting the strips and the strength of the electrical field. Also, the throttle properties can be controlled and regulated by appropriately specifying the spatial relationships in container 3 and the electrical fields connected to the electroviscous liquid.

Figure 2:
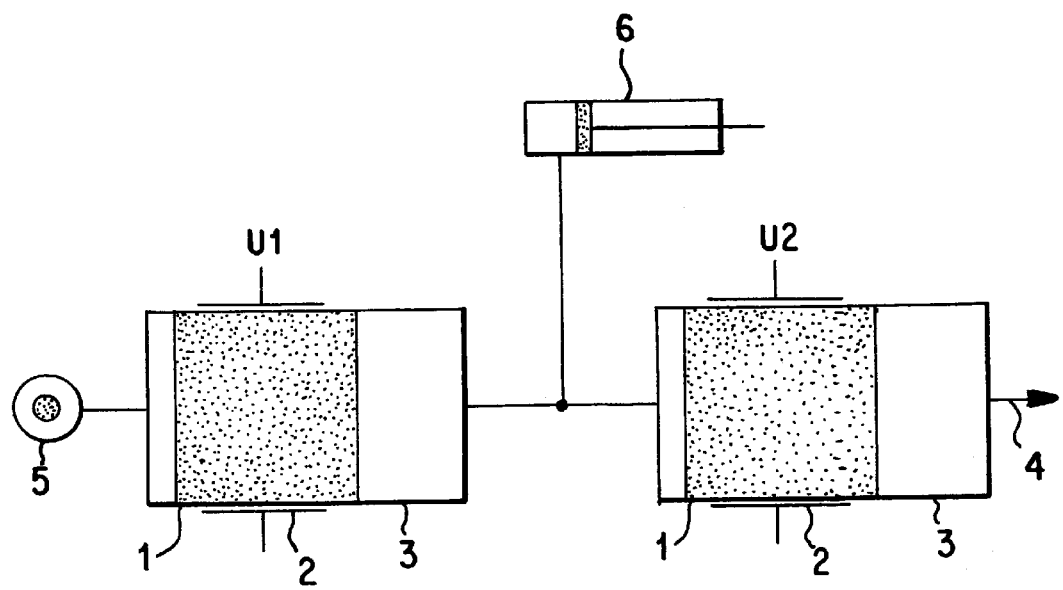
FIG. 2 is a schematic sectional view of an electropneumatic device constructed according to another preferred embodiment of the invention.

FIG. 2 shows a type of control valve in which the two devices according to FIG. 1 are in series. Gas for example can flow into inlet 5 and through the electroviscous liquid 1 that has had its properties affected by a voltage U1. Once the gas has been separated from the electroviscous liquid on the right side of container 3, this gas reaches the outlet of the container on the left and hence the inlet to a consumer 6 and right container 3. By applying a second voltage U2 to electroviscous liquid 1, which is in right container 3, it is now possible for example to bring about a different viscosity or by shaping the lamellar passageways in container 3 differently to shape the ability of the gas to flow through differently than in the left container. In this manner, the operation of consumer 6 can be controlled. As long as for example the viscosity of electroviscous liquid 1 in right container 3 is less than the viscosity of electroviscous liquid 1 in left container 3, the piston of consumer 6 can move leftward as shown in FIG. 2. In the reverse case, the piston of consumer 6 can move rightward.

In this embodiment a single-acting cylinder 6, returned by a spring not shown in FIG. 2, is preferred. Also it is preferable to provide cylinder 6 with ventilation. The ventilating means is also not shown in FIG. 2.

It would also be possible to return the piston without a spring for example by having the pressure in the feed line to the cylinder be lower than the surrounding pressure.

Various structural arrangements can be used to provide for the passage of the gaseous medium, for example air, through the rheologic fluid such that the flow of gaseous medium is controlled by the variable viscosity of the rheologic fluid. In a very simple arrangement, the air can pass through the fluid from underneath to above the fluid by natural gravitation. The driving force is the temperature of the gas and the fluid, or the so-called brownian fluctuation, together with the gravitation. In embodiments utilizing this phenomena, the fluid is entered from being lost at the inlet of the gaseous medium by way of a membrane which is semipermeable so as to allow the gaseous medium to go through the membrane while blocking the flow of the rheologic fluid.

Due to an increase of the brownian motion if the temperature is increased, the gaseous medium flowthrough can be increased by increasing temperature. However, the temperature range should be limited as a practical matter because of changes in the rheologic fluid which can react at high temperatures to the materials in contact with the fluid, and moreover the properties of the rheologic fluid can degrade.

Figure 1A:
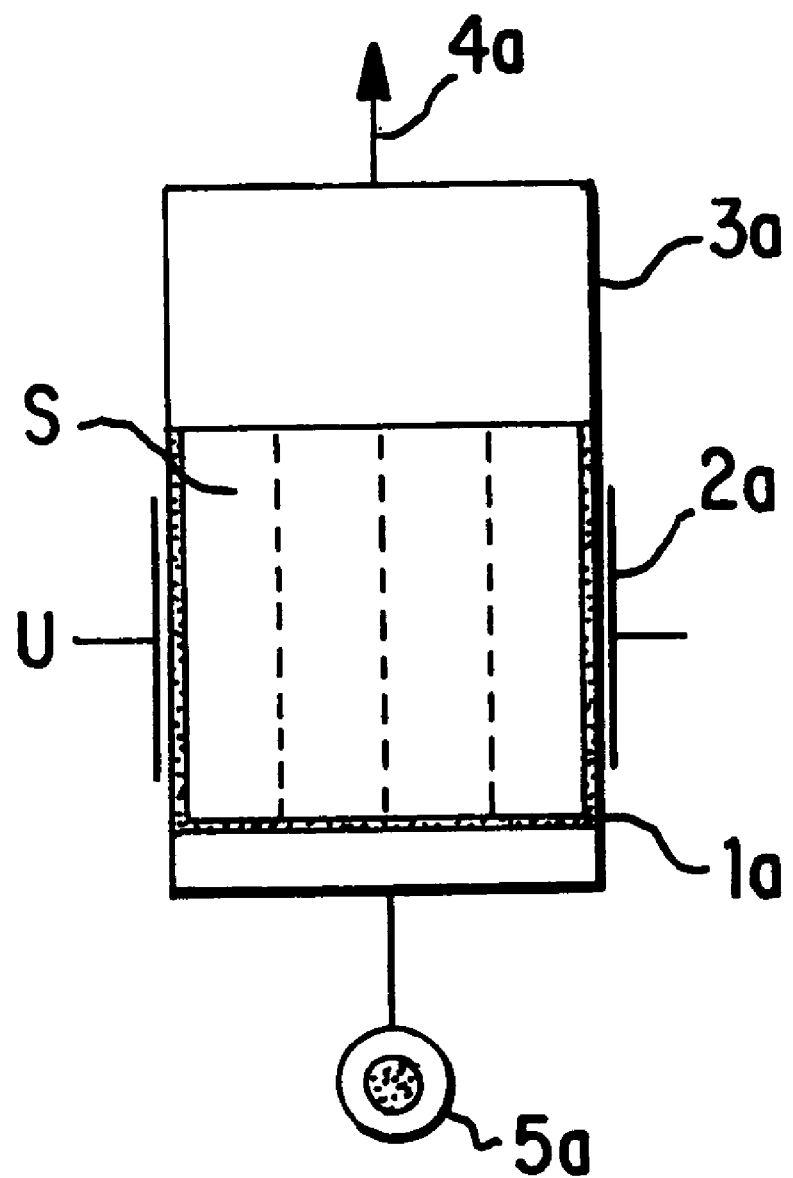
FIG. 1A is a schematic sectional view similar to FIG. 1, showing another preferred embodiment of the invention.

FIG. 1A shows another embodiment according to the invention of a device for controlling the flow of a gaseous medium through a fluid and/or device, shown schematically. Reference signs 1a, 2a, 3a, 4a and 5a of FIG. 1a correspond to reference signs 1–5 of FIG. 1. In addition, however, strips S are disposed in the container 3a and are at least partially wetted with the fluid and serve as means for conducting the gaseous medium.

The physical arrangement for transmitting the gaseous medium, such as air, through the rheologic fluid can also be merely the container itself in the form of a variable shape. For example, a tube, a cube, a rectangular box, a sphere, or other shape could be contemplated, with the shape being changed by the application of the electrical or magnetic field to the rheologic fluid in contact with the container.

In certain contemplated embodiments, lamella as mentioned above, such as ribs or slats, and especially plates, blades or disks which are thin are arranged parallel to one another in the rheologic fluid. Neighboring disks or plates or other lamella structures can be connected to different electrical or magnetic forces so that the control of the fluid intermediate the lamella is improved. For example, if three plates were used, two of them near walls of opposite sides of a container and one in the middle and parallel to the other plates, the electric or magnetic field between two neighboring plates could be set such that the fluid between those plates selectively closes and opens the passage throughopening between the plates for the flow of the gas, while on the other side the electric or magnetic field is controlled in such a manner that the amount of gas which would come through the fluid is less than half of the highest amount.

A similar arrangement could be formed with four or more plates to form a grid pattern that can be used to control the flow of the gaseous medium therethrough by controlling electric or magnetic fields acting on the rheologic fluid.

In certain preferred embodiments, the gaseous medium can naturally migrate through the rheologic fluid when it is in a liquid state, while solidification of the rheologic fluid changes the transmission rate of the gas.

In certain preferred embodiments, different pressure could be applied at the inlet and outlet for the gaseous medium, and further controlling the flow through the rheologic fluid by way of the above described application of magnetic or electric fields.

Depending on the amount of gaseous medium which should be fed through the fluid, there could be use a cross-flow operation or a dead-end operation. The above mentioned embodiments all relate to a dead-end operation. In cross-flow operations, the gaseous medium, or at least a larger amount of the gaseous medium, is fed over the surface of the fluid, and only some parts of the gaseous medium are then migrating into the fluid and through the fluid. However, the most preferred embodiments utilize one of the dead-end operations.

A further driving force for the gaseous medium through the rheologic fluid according to certain preferred embodiments is an electrical field. In this case, the molecules or atoms of the gaseous medium are electrically charged, and an electric field is applied such that the gaseous medium is accelerated in the electric field towards the outlet. In these embodiments, a magnetic rheologic fluid should be utilized which is not affected by the electric field.

According to certain embodiments, to further increase the diffusion of the gaseous medium through the rheologic fluid, the gaseous medium should be accelerated. A kind of a gas-washing means, a gas-washing pump or scrubber pump could be utilized for this purpose, as well as the above-described electrical field application to the gaseous electrically charged molecules or atoms.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for controlling the flow of a gaseous medium through a fluid, comprising the following method steps:
   providing an electrorheologic fluid through which the gaseous medium can be conducted, and
   controlling the viscosity of the electrorheologic fluid to thereby control the flow of the gaseous medium.

2. Method according to claim 1, wherein the viscosity of the fluid is controlled by applying a controllable field.

3. Method according to claim 2, wherein the controllable field is an electrical field.

4. Method according to claim 3, wherein the gaseous medium is air.

5. Method according to claim 1, wherein the gaseous medium is air.

6. Method according to claim 1, wherein said electrorheologic fluid is disposed in a control circuit for a device.

7. Method according to claim 1, wherein said electrorheologic fluid is disposed in a control circuit for an overpressure valve.

8. Method according to claim 1, wherein said electrorheologic fluid is disposed in at least one control circuit for a control valve.

9. Method according to claim 8, wherein the at least one control circuit includes at least two control circuits, each of the control circuits being provided with an outlet and an inlet for the gaseous medium and the outlet of one of the control circuits being connected with the inlet of another one of the control circuits.

10. Method according to claim 1, wherein said electrorheologic fluid is disposed in at least one control circuit for adaptive bumpers for motor vehicles.

11. Method according to claim 1, wherein said electrorheologic fluid is disposed in at least one control circuit for clutches for motor vehicles.

12. A system for controlling the flow of a gaseous medium through a fluid comprising:

an electrorheologic fluid, a means for guiding the gaseous medium through the fluid, and a means for applying a field at least partially in the area of the electrorheologic fluid.

13. A system according to claim 12, wherein said fluid is disposed in a control circuit for a device.

14. System according to claim 12, wherein the gaseous medium is air.

15. System according to claim 12, wherein the field is an electrical field.

16. System according to claim 13, wherein the means for conducting the gaseous medium are strips disposed in the device and at least partially wetted with the fluid.

17. System according to claim 12, wherein the means for applying a field has electrical components.

18. System according to claim 12, wherein the fluid is at a distance from chemically vulnerable materials.

19. System according to claim 13, wherein said device is an overpressure valve controlled by said control circuit.

20. System according to claim 19, wherein a pressure point of the overpressure valve can be set by the strength of the field applied.

21. System according to claim 13, wherein said device is a control valve controlled by said control circuit.

22. System according to claim 21, comprising at least two devices being controlled in which an outlet and an inlet for the gaseous medium are provided and in which the outlet of one device is connected with the inlet of the other device.

23. System according to claim 22, wherein a consumer can be linked to the connection between the two devices.

24. System according to claim 13, wherein said device is an adaptive bumper for motor vehicles controlled by said control circuit.

25. System according to claim 13, wherein said device is a clutch for motor vehicles controlled by said control circuit.

\* \* \* \* \*